US012184023B2

(12) United States Patent
Fuhrer

(10) Patent No.: US 12,184,023 B2
(45) Date of Patent: Dec. 31, 2024

(54) CRIMPING TOOL

(71) Applicant: AGRO AG, Hunzenschwil (CH)

(72) Inventor: Stefan Fuhrer, Sarmenstorf (CH)

(73) Assignee: AGRO AG, Hunzenschwil (CH)

( * ) Notice: Subject to any disclaimer, the term of this patent is extended or adjusted under 35 U.S.C. 154(b) by 0 days.

(21) Appl. No.: 17/920,603

(22) PCT Filed: Apr. 23, 2021

(86) PCT No.: PCT/EP2021/060697
§ 371 (c)(1),
(2) Date: Oct. 21, 2022

(87) PCT Pub. No.: WO2021/214301
PCT Pub. Date: Oct. 28, 2021

(65) Prior Publication Data

US 2023/0155337 A1 May 18, 2023

(30) Foreign Application Priority Data

Apr. 24, 2020 (CH) .................................... 00487/20

(51) Int. Cl.
*H01R 43/048* (2006.01)

(52) U.S. Cl.
CPC ...... *H01R 43/048* (2013.01); *Y10T 29/53235* (2015.01)

(58) Field of Classification Search
CPC ...... H01R 9/0518; H01R 43/048; H01R 9/05; H01R 13/5808; H01R 43/00; Y10T 29/53035; Y10T 29/53235
USPC ........................... 29/753, 747, 751, 761, 876
See application file for complete search history.

(56) References Cited

U.S. PATENT DOCUMENTS

| | | | | |
|---|---|---|---|---|
| 3,103,548 A * | 9/1963 | Concelman ............ | H01R 24/40 174/75 C |
| 7,627,944 B2 * | 12/2009 | Holliday ................. | B25B 27/10 72/409.14 |
| 2010/0000788 A1 | 1/2010 | Kawase et al. | |
| 2018/0013253 A1 | 1/2018 | Wang | |

OTHER PUBLICATIONS

EPO (Riswijk, NL), English language translation of the International Search Report, Form PCT/ISA/210, for International Application PCT/EP2021/060697, Jul. 9, 2021 (2 pages).

* cited by examiner

*Primary Examiner* — Thiem D Phan
(74) *Attorney, Agent, or Firm* — Pauley Erickson & Swanson

(57) ABSTRACT

A crimping tool (1) is used to axially fasten a cable braid (3) of a cable (2) between a crimp sleeve (4) arranged on the cable (2) and a support sleeve (5) by means of crimping. The crimping tool (1) includes a first pressing jaw (6) having a first through-opening (8), which extends in an axial direction (x), and a second pressing jaw (7) having a second through-opening (9), which is coaxial with the first through-opening (8). The first and the second pressing jaw (6, 7) are displaceable relative to each other in the axial direction. For the crimping, the first pressing jaw (6) has a support surface (10) for supporting the crimp sleeve (4) in the axial direction, and the second pressing jaw (7) has a funnel-shaped forming surface (11) arranged around the second through-opening (9), for crimping the crimp sleeve (4) with respect to the support sleeve (5).

20 Claims, 3 Drawing Sheets

CRIMPING TOOL

CROSS REFERENCE TO RELATED APPLICATION

This application is a National Phase filing in the United States, under 35 USC § 371, of PCT International Patent Application PCT/EP2021/060697, filed on 23 Apr. 2021 which claims the priority of Swiss Patent Application CH 00487/20 filed 24 Apr. 2020.

These applications are hereby incorporated by reference herein in their entirety and is made a part hereof, including but not limited to those portions which specifically appear hereinafter.

BACKGROUND OF THE INVENTION

Field of the Invention

The present invention relates to a crimping tool for axially fastening a cable braid of a cable between a crimp sleeve arranged on the cable and a support sleeve by crimping.

Discussion of Related Art

It is known from the state of the art to crimp a cable braid, in particular a cable shielding, of a cable with a crimp sleeve. When mounted on the cable, the crimp sleeve can be used to contact the shielding and/or divert line disturbances.

Usually, the cable braid is crimped with the crimp sleeve in radial direction. However, this method often results in insufficient electrical contacting of the shielding, which leads to poor quality of the shielding with high shielding losses. Insufficient electrical contacting can occur, for example, if the crimping of the braid is too high as well as too low. Radial crimping can further result in the cable being deformed in such a way that it has an oval cross-section. This can, among other things, make later installation, especially sealing, of the crimped cable more difficult. Furthermore, the cable insulation can be damaged by the radial crimping.

SUMMARY OF THE INVENTION

It is an object of the invention to provide a crimping tool for improved crimping of a cable braid with a crimp sleeve.

A crimping tool according to the invention is used for axially fastening a cable braid of a cable between a crimp sleeve arranged on the cable and a support sleeve by crimping. For this purpose, the crimping tool includes a first pressing jaw with a first through-opening which extends in an axial direction for receiving the cable during crimping. Furthermore, the crimping tool includes a second pressing jaw with a second through-opening arranged in an axial direction for receiving the cable during crimping. The second through-opening is essentially coaxial with the first through-opening. The first and the second pressing jaws are displaceable relative to each other in the axial direction. For this purpose, the first and second pressing jaws can be operatively connected to a (pressing) device via operative connection means. The pressing device allows displacing the first and/or the second pressing jaw and to applying a pressing force. For crimping, also merely one of the two pressing jaws may be arranged to be displaceable relative to the other pressing jaw. Advantageously, the second pressing jaw is displaceable in relation to the first pressing jaw.

For crimping, the first pressing jaw has at least one support surface for supporting the crimp sleeve in the axial direction. The support surface can be ringlike and around the first through-opening. Advantageously, the support surface is arranged on a shoulder within the first through-opening and is aligned normal to the axial direction. When the first pressing jaw includes a first pressing insert, as described further below, the support surface is advantageously arranged on the first pressing insert. The crimp sleeve can be inserted into the first through-opening from the axial direction and from the direction of the second pressing jaw until it rests against the support surface. It is advantageous to insert the cable with the crimp sleeve already mounted. The crimp sleeve (loosely) mounted on the cable sits in radial direction on a support sleeve arranged in it. The cable braid is arranged between the support sleeve and the crimp sleeve. The cable braid is usually expanded and then placed around the support sleeve and the crimp sleeve is pushed over the support sleeve and the cable braid. In an inserted state of the cable in the crimping tool, the cable advantageously extends through the first and through the second pressing jaw. The crimp sleeve can already be resting against the support surface of the first pressing jaw for crimping.

According to the invention, the second pressing jaw further includes a forming surface arranged around the second through-opening for crimping the crimp sleeve with respect to the support sleeve. The forming surface is funnel-shaped. Advantageously, the forming surface is arranged inside the second through-opening. This means that the forming surface can at least partially form the second through-opening. A diameter of the funnel-shaped forming surface thus advantageously decreases (in axial direction) with increasing distance from the first pressing jaw. The funnel-shaped forming surface can be conical at least in some areas. Advantageously, however, the funnel-shaped forming surface is arched in the direction of a center axis of the second through-opening.

Depending on the embodiment, the funnel-shaped forming surface can be divided into several ringlike surface areas. The surface areas can be arranged one behind the other in the axial direction. It is advantageous for adjacent surface areas to merge into one another. Each surface area can have a different opening angle to the center axis (of the second through-opening), i.e., the respective surface areas can each be essentially conical. The opening angles of the respective surface areas advantageously increase in the axial direction and towards the first pressing jaw. In a preferred embodiment, two surface areas are provided which merge into one another. The first surface area can, for example, have a (first) opening angle of 15°-25° (degrees) to the center axis. The second surface area, on the other hand, can have a larger second opening angle (compared to the first opening angle). The second opening angle can be 50°-60° (degrees) to the center axis. Furthermore, the second surface area may merge into the (second) pressing surface as described below. The first surface area, on the other hand, may merge into a cylindrical area of the second through-opening.

An inner diameter of the forming surface, respectively the diameter of the cylindrical area of the second through-opening, is advantageously selected in such a way that it corresponds to the diameter of the cable to be crimped and an additional clearance. The clearance can be between approx. 0-0.4 mm, depending on the pressing force. In this way, the cable insulation is minimally damaged during crimping. For a space-saving crimping on the cable, the forming surface can be arranged in radial direction within the supporting surface, i.e., an outer diameter of the forming surface is preferably smaller than an inner diameter of the supporting surface. The forming surface may be rotationally symmetrical. However, in some embodiments, a non-rotationally symmetrical forming surface may also be advantageous. For example, the forming surface may be corrugated and/or serrated and/or otherwise patterned along the circumference.

In order to facilitate the processing of the cable, in particular the insertion and removal of the cable into or from the corresponding through-opening, at least one pressing jaw can be divisible along a separation plane through the corresponding through-opening. Advantageously, at least the second pressing jaw is divisible along a separation plane through the corresponding second through-opening. The divisible pressing jaw may be divisible into a first jaw part and a second jaw part. The first jaw part may be for operative connection to the pressing device. The second jaw part can be operatively connected to the first jaw part for crimping along the separation plane. This has the advantage that in an open position, in which the first and second jaw parts are at least partially detached from each other, the cable can be inserted laterally into the pressing jaw. This insertion from the side is particularly easy and can be carried out, for example, with one hand. In a closed position, the first jaw part and the second jaw part can form the corresponding through-opening.

To further simplify the processing, the first jaw part and the second jaw part can be operatively connected to each other via at least one joint. In this way, the second jaw part can be folded away quickly and easily via the at least one joint. The at least one joint may include, for example, a plain bearing bush or a hinge, such as a snap hinge. In the closed position, the second jaw part may be supplementarily fixed to the first jaw part by a closing mechanism for crimping. For opening and closing the first and second jaw parts, the second jaw part may include a handle. The handle can be inserted into a recess in the first jaw part, the recess corresponding to the handle.

Alternatively, or in addition, the second jaw part can be fixed to the first jaw part in the open position and/or in the closed position via at least one magnet. For this purpose, at least one magnet can be arranged in each of the first and second jaw parts, which interact magnetically in the open and/or closed position. A defined position of the second jaw part in the open position as well as in the closed position has the advantage that damage due to accidental closing in an intermediate position can be avoided. To fix the second jaw part in the closed position, at least one magnet, preferably two opposing magnets, can be arranged on the separation plane.

For crimping, the second pressing jaw can be displaced relative to the first pressing jaw from a start position to an end position. In the start position, the first and second pressing jaws are advantageously spaced apart. In the start position, the cable, the crimp sleeve and the support sleeve can be positioned in the crimping tool. Subsequently, the first and the second pressing jaw can be displaced relative to each other in axial direction. For mutual centering, the first and/or the second pressing jaw can have a centering segment. When moving from the start position to the end position, a centering segment arranged on the first pressing jaw can engage in a centering segment arranged on the second pressing jaw and provide an alignment of the pressing jaws with respect to each other for crimping. Good centering is also achieved if one pressing jaw is pushed into the other pressing jaw in certain areas when it is moved from the start position to the end position. It is particularly advantageous if the second pressing jaw, in particular the first and the second jaw part of the divisible second pressing jaw, can be pushed area by area into the first pressing jaw. In the end position, the second pressing jaw is advantageously arranged in the radial direction at least in some areas in the first pressing jaw.

When the pressing jaws are pushed further together, the forming surface comes into contact with the crimp sleeve arranged in the first pressing jaw and a crimp area of the crimp sleeve can be deformed. Advantageously, the crimping area slides along the forming surface. The funnel shape of the forming surface ensures that the crimp area is formed as gently and as chip-free as possible. As a result, the crimping area, or the crimp sleeve, fits snugly around the cable and wraps itself around the support sleeve arranged in the crimp sleeve. The snug fit also has a positive effect on the bend protection of the crimped cable. The cable braid is crimped between the support sleeve and the crimp sleeve during this process. In the end position, the desired crimping or rather plastic deformation of the crimp sleeve and, if applicable, the support sleeve is achieved. For a clearly defined end position, two pressing surfaces can be provided which rest on each other in the axial direction in the end position. However, variants are also conceivable in which the pressing jaws do not come to an adjacent rest stop in the end position, i.e., no pressing surfaces are in contact with each other. The end position can then be defined by a parameter of the pressing device, such as a hydraulic pressure or a certain spindle rotation or similar. However, a first and a second pressing surface, which are pressed against each other in the end position, have the advantage that a contact pressure between the first and the second pressing surface can be measured, e.g., with a sensor. For a well measurable contact pressure, it is advantageous if the first and second pressing surfaces are arranged close to the crimping. It is therefore advantageous that the first pressing surface surrounds the first through-opening and/or the second pressing surface surrounds the second through-opening in a ringlike manner. Advantageously, the first pressing surface surrounds the support surface and/or the second pressing surface surrounds the forming surface.

Depending on the application, the crimping tool can include an embossing stamp. This can be arranged on the first and/or on the second pressing jaw, in particular on the first and/or the second pressing insert. Advantageously, the embossing stamp is aligned in the axial direction. The embossing stamp is used to apply an embossing to the crimp sleeve. Preferably, the embossing stamp is arranged on the second pressing jaw, in particular on the second pressing insert. The embossing stamp may be arranged on the forming surface, in particular on a surface region of the forming surface adjacent to the pressing surface. The embossing stamp may be arranged on the second pressing jaw in axial direction opposite the support surface of the first pressing jaw. The embossing can show information about the crimping parameters used, such as tool parameters, number of pressings, pressing force, manufacturer's logo, etc.

Depending on the application, the first pressing jaw may include a first pressing insert around the first through-opening and/or the second pressing jaw may include a second pressing insert around the second through-opening. A first and a second pressing insert can be designed for a specific cable diameter and/or cable type. In this way, different pressing inserts can be used depending on the use. The first pressing insert can be arranged in a first retainer of the first pressing jaw and/or the second pressing insert can be arranged in a second retainer of the second pressing jaw.

The respective retainer can include a retainer opening in the axial direction, in which the corresponding pressing insert can be received. The first and/or second pressing insert can be realized in one or more parts. The first and/or second pressing insert can also be sleeve shaped. In the assembled state in the respective pressing jaw, the respective pressing insert forms the corresponding through-opening at least in some areas. Advantageously, the first and/or second pressing insert each have a shoulder with a front surface on their outer sides. The front surface serves as a support in the axial direction on the first or second retainer. The first and/or the second pressing insert can be made of metal. Advantageously, the first and/or the second pressing insert includes a cold-work steel, in particular a tough, hardened cold-work steel.

The first and/or the second pressing insert can be held in the retainer with at least one magnet. However, other fastening possibilities, such as fastening with at least one screw, are also conceivable. One advantage of using a magnet, however, is the tool-free assembly. For this purpose, several magnets can be arranged distributed around the circumference of the respective receiving opening. Alternatively, or additionally, at least one magnet can be arranged in the axial direction between a pressing insert and the corresponding retainer. Advantageously, the at least one magnet lies against the front surface of the corresponding pressing insert in the axial direction and in the assembled state of the pressing insert.

Alternatively, or additionally, the first and/or the second pressing insert can be fixed in the corresponding retainer with at least one spring pressure element. This is particularly useful if the pressing jaw cannot be divided, i.e., it is advantageous to fix the first pressing insert in the first retainer with at least one spring pressure element. The at least one spring pressure element can, for example, be arranged in radial direction between the retainer and the pressing insert. The pressing insert can have a recess in which the spring pressure element can engage. The spring pressure element thus holds the pressing insert in the receiving opening and enables a quick and easy exchange of the pressing insert without tools.

If the first and/or the second pressing jaw is divisible, the pressing insert arranged in the retainer of the pressing jaw can also be divisible into a first and a second half of the insert. Depending on the manufacture, the respective pressing insert can be divided into the first and second insert halves by a cutting process, such as wire erosion. The insert halves can then simply be mounted in the open position of the corresponding pressing jaw. In order to mount the two insert halves in a distinctive way, they can have a marking, a coding or the like. For assembly, the receiving openings can include a circumferential notch in which a circumferential rim of an (assembled) pressing insert can engage. The notch and the rim form an undercut in the axial direction in the assembled state. Advantageously, the second pressing jaw can be divided into a first and a second jaw part, as described above. One half of the insert can be arranged in each jaw part. The two insert halves, when joined together, form the second pressing insert. This can have a circumferential rim which forms an undercut in the axial direction with a notch arranged in the receiving opening of the second retainer. In the closed position of the second jaw part, the first half of the insert arranged in the first jaw part forms the second through-opening with the second half of the insert arranged in the second jaw part, at least in some areas.

BRIEF DESCRIPTION OF SEVERAL VIEWS OF THE DRAWINGS

Aspects of the invention are explained in more detail with reference to the examples of embodiments shown in the following figures and the accompanying description, showing.

DETAILED DESCRIPTION OF THE INVENTION

Figure 1:
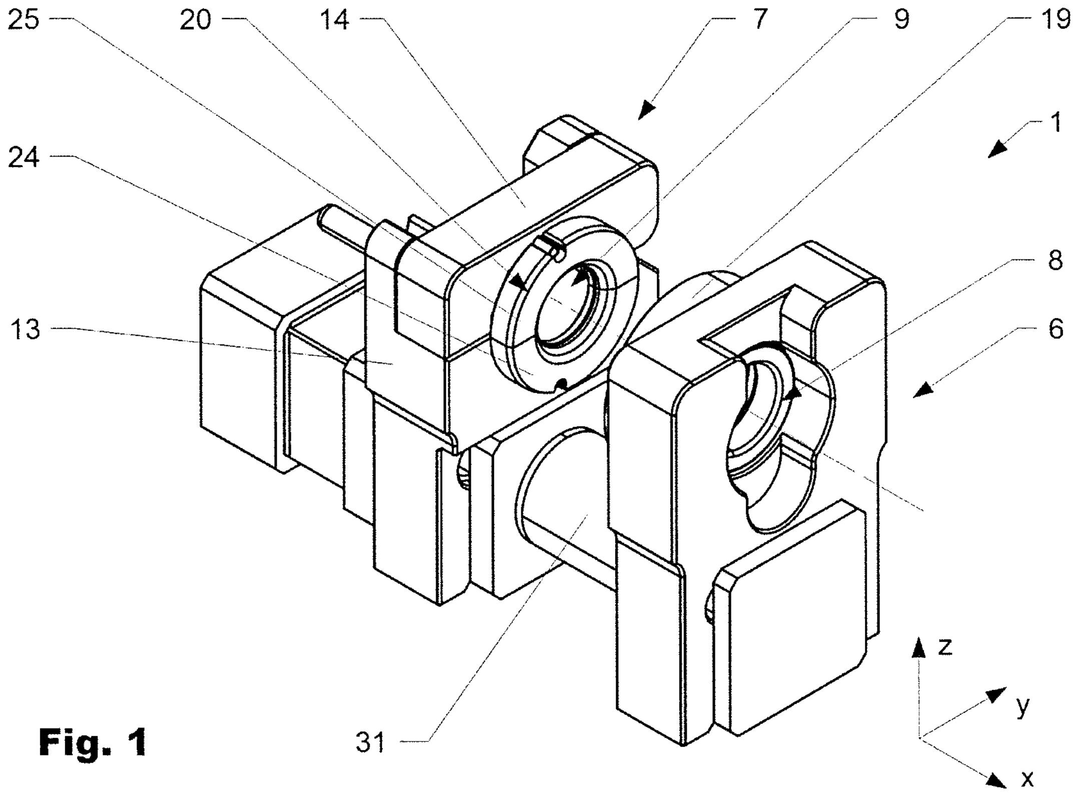
FIG. 1 shows a crimping tool according to the invention in a start position and in a perspective view on a guide rail.
Figure 2:
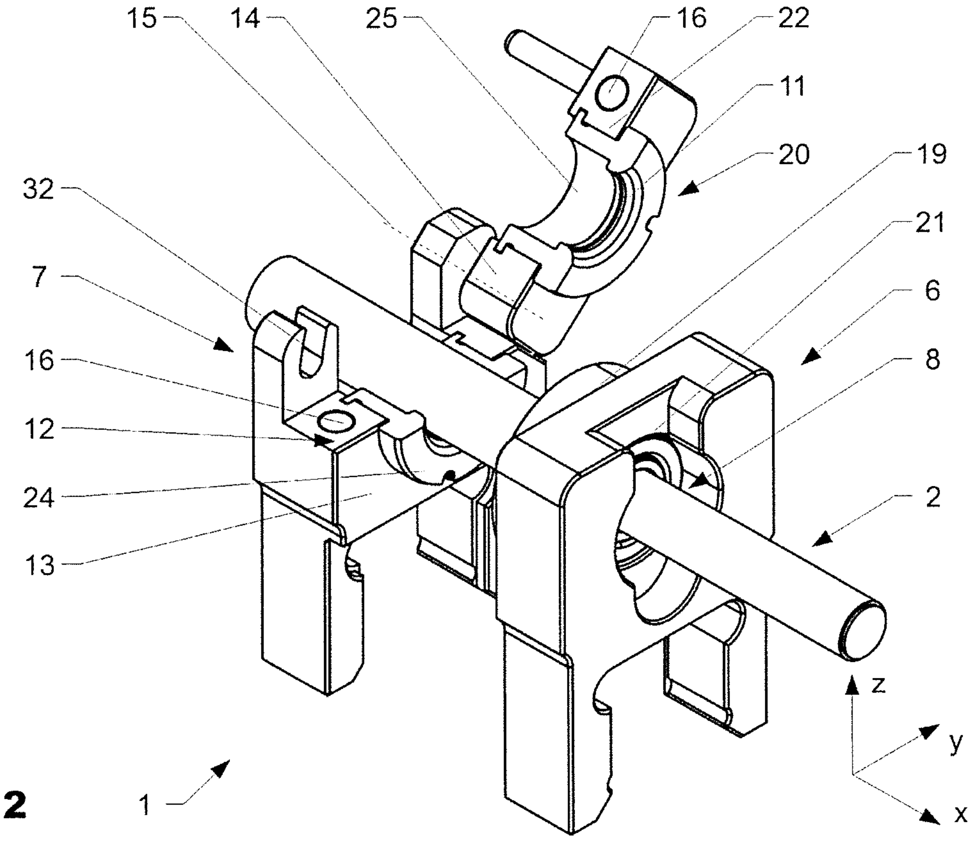
FIG. 2 shows the crimping tool according to FIG. 1 in the start position in a perspective view with the second pressing jaw open and the cable inserted.
Figure 3:
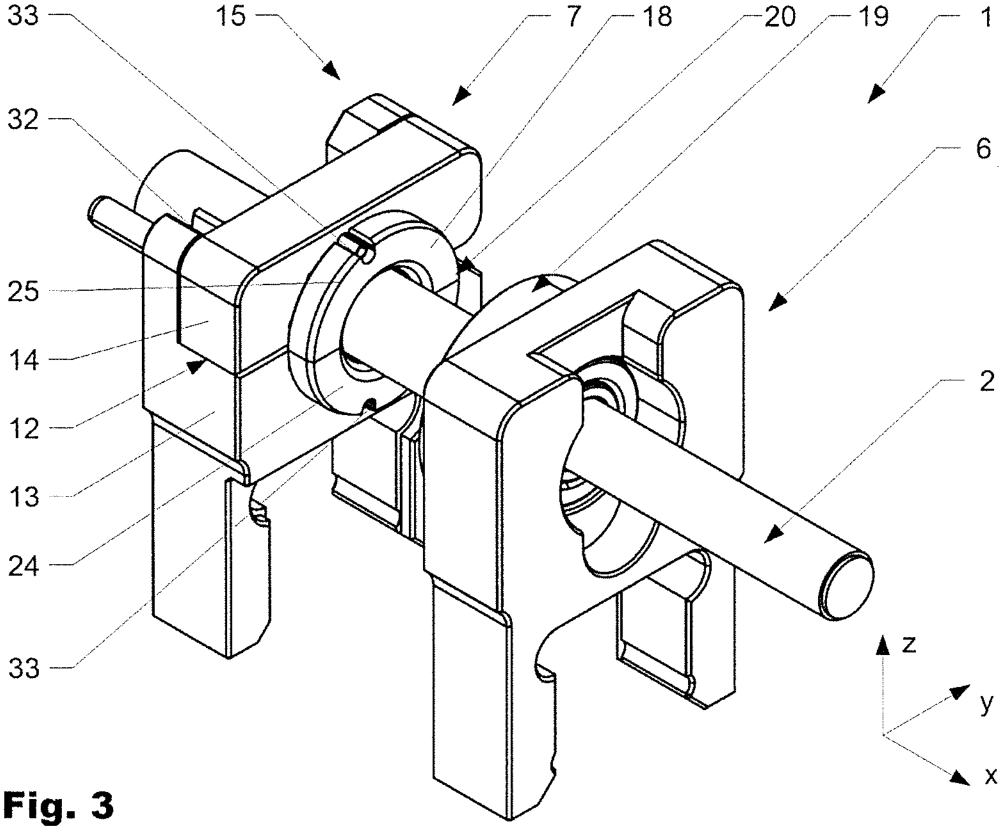
FIG. 3 shows a crimping tool according to FIG. 2 in an open position and in a perspective view with the second pressing jaw closed.
Figure 4:
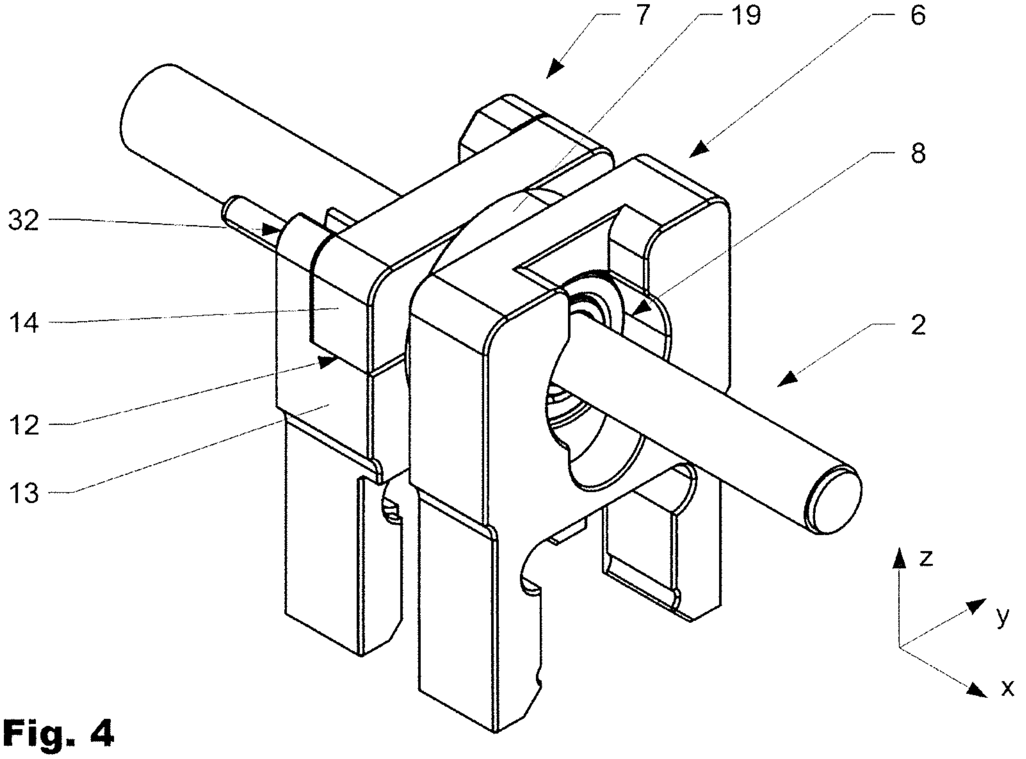
FIG. 4 shows a crimping tool according to FIG. 2 in an end position in a perspective view.

FIG. 1 shows a crimping tool 1 according to the invention mounted on a guide rail 31 of a pressing device. The guide rail respectively the pressing device are not shown in the other figures. FIG. 2 to FIG. 4 show a crimping tool 1 according to the invention in a perspective view. The crimping tool 1 includes a first pressing jaw 6 with a first through-opening 8 and a second pressing jaw 7 with a second through-opening 9. The first and second through-openings 8, 9 are coaxial with each other and extend in an axial direction (x-direction). The through-openings 8, 9 serve to receive a cable 2 during crimping. The second pressing jaw 7 is displaceable relative to the first pressing jaw 6 in an axial direction from a start position to an end position. The start position is shown in FIG. 1, while the end position is shown in FIG. 4.

The second pressing jaw 7 can be divided into a first jaw part 13 and a second jaw part 14 along a separation plane 12 through the second through-opening 9 for removing the crimped cable 2. The first jaw part 13 serves for the operative connection to the guide rail 31 and/or the pressing device. The second jaw part 14 can be moved from an open position, see FIG. 2, to a closed position, see FIG. 3. In the open position, a cable 2 can be inserted laterally into the second pressing jaw 7. In the closed position, the first jaw part 13 and the second jaw part 14 form the second through-opening 9. For ease of assembly, as shown, the second jaw part 14 may be fixed in the closed position to the first jaw part 13 via at least one magnet 16. Another magnet (not shown) may be used to fix the second jaw member 14 in the open position to the first jaw member 13. The first jaw part 13 and the second jaw part 14 are operatively connected via a joint 15 in the form of a plain bearing bush (only schematically indicated). In the closed position, the second jaw part 14 can additionally be fixed to the first jaw part 13 via a closing mechanism 32. In the case shown, the second jaw part 14 includes a handle which can be inserted into a corresponding recess in the first jaw part 13.

The first and second pressing jaws 6, 7 each include a pressing insert 19, 20, which is received in a respective retainer 21, 22. The retainers 21, 22 of the pressing jaws 6, 7 each include a receiving opening for receiving the pressing inserts 19, 20. The first pressing insert 19 of the first pressing jaw 6 can be inserted into the first retainer 21, or the receiving opening, from the axial direction until it rests with a front surface 26 in the axial direction. The (first) pressing insert 19 can be held in the receiving opening by means of a radially oriented spring pressure element 23 (see FIG. 5). The second pressing insert 20 can be divided into two insert halves 24, 25. Advantageously, a first half of the insert 24 is arranged in a retainer of the first jaw part 13 and a second half of the insert 25 is arranged in a retainer of the second jaw part 14. In order to mount the two insert halves 24, 25 unmistakably, they can have a marking and/or coding 33. In the case shown, the first and second jaw parts 13, 14 each include a pin which engages in a corresponding recess in the first and second insert halves 24, 25 respectively in the assembled state (see e.g., FIG. 1). The pins, respectively the recesses, are at different circumferential positions in relation to the second through-opening 9. Thus, the second half of the insert 25 cannot be inserted in the first jaw part 13.

Figure 5:
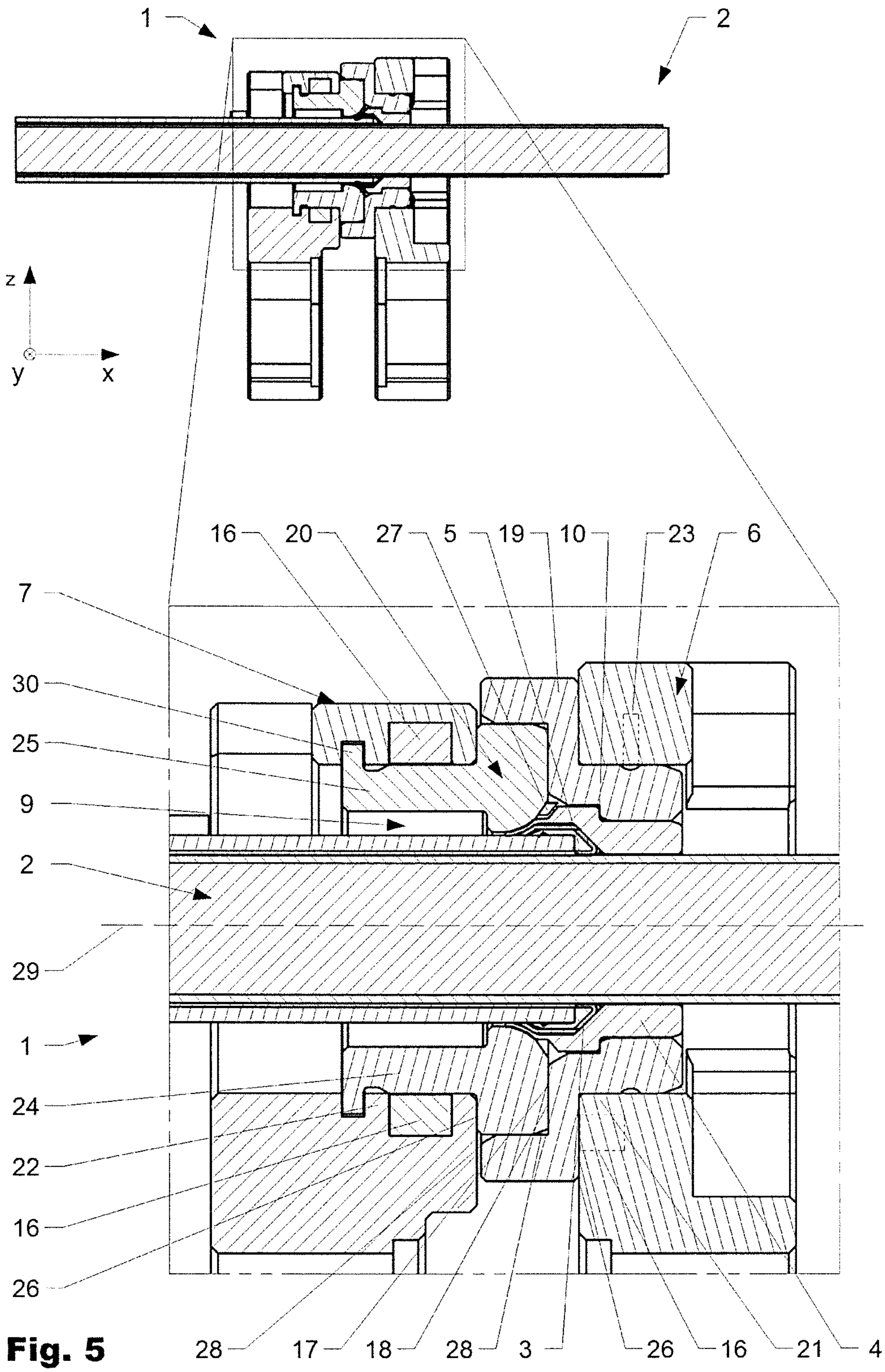
FIG. 5 shows a sectional view of the crimping tool according to FIG. 4 in the end position.

The first and/or the second insert halves 24, 25 can be inserted laterally in the open position of the second pressing jaw 7. The two-part second pressing insert 20 can have a circumferential rim 30 which engages in a corresponding notch of the second retainer 22 and forms an undercut with the latter in the axial direction. In addition, the pressing inserts 19, 20 can each be held by means of at least one magnet 16. Advantageously, several magnets 16 are arranged around the respective through-opening 8, 9 and/or distributed along the front surfaces 26 (as schematically indicated in FIG. 5).

During the displacement of the pressing jaws, the pressing inserts 19, 20 are pushed into each other. At least one centring segment 28 arranged on the first and/or second pressing insert 19, 20 can serve for a correct alignment of the pressing inserts to each other (see FIG. 5). After centring and in the end position, two ringlike pressing surfaces 17, 18 rest on each other. The end position in a sectional view is shown in FIG. 5. The pressing surfaces 17, 18 are arranged on the first and second pressing jaws 7, 8, respectively on the respective pressing inserts 19, 20. When a maximum contact pressure is reached on the pressing surfaces 17, 18, a desired crimping is achieved and the crimping tool 1, respectively the first and the second pressing jaws 6, 7, can be pushed apart and the crimped cable 2 can be removed. FIG. 5 shows that the first pressing jaw 6, respectively the first pressing insert 19, has a support surface 10 for supporting a crimp sleeve 4 in the axial direction. The second pressing jaw 7, respectively the two-part second pressing insert 20, on the other hand, has a funnel-shaped forming surface 11 arranged around the second through-opening 9 for crimping the cable braid 3 between the crimp sleeve 4 and a support sleeve 5 arranged therein. The funnel-shaped forming surface 11 is arched in the direction of a centre axis 29 of the second through-opening 8. The forming surface 11 advantageously first comes into contact with the crimp sleeve 4 arranged in the first pressing jaw 6 when the pressing jaws 6, 7 are displaced relative to each other. The contact deforms a crimping area of the crimp sleeve 4. The funnel-shaped forming surface 11 causes the crimping area to slide along the forming surface 11 and to wrap around the cable 2 as shown and to wrap around the support sleeve 5 arranged in the crimp sleeve 4. The cable braid 3 is crimped and fixed between the support sleeve 5 and the crimp sleeve 4 during this process. For quality assurance in the sense of traceable crimping, the crimping tool 1 can also include a embossing stamp 27. In the case shown, the embossing stamp 27 is arranged on the second pressing jaw 7, in particular on the second pressing insert 20. The embossing stamp 27 is arranged on the forming surface 11. The embossing stamp 27 is used to apply an embossing, which can, for example, provide information about crimping parameters, manufacturer, etc.

The invention claimed is:

1. A crimping tool (1) for axially fastening a cable braid (3) of a cable (2) between a crimp sleeve (4) arranged on the cable (2) and a support sleeve (5) by crimping, comprising:

a. a first pressing jaw (6) having a first through-opening (8) extending entirely through the first pressing jaw (6) in an axial direction (x) for receiving the cable (2) during crimping; and b. a second pressing jaw (7) with a second through-opening (9) extending entirely through the second pressing jaw (7) and arranged in the axial direction, which is arranged coaxially with the first through-opening (8) and serves to receive the cable (2) during crimping; wherein c. the first and second pressing jaws (6, 7) are displaceable relative to each other along the axial direction;

d. the first pressing jaw (6) has a support surface (10) for supporting the crimp sleeve in the axial direction; and e. the second pressing jaw (7) includes a funnel-shaped forming surface (11) arranged around the second through-opening (9) for crimping the crimp sleeve (4) with respect to the support sleeve (5).

2. The crimping tool (1) according to claim 1, wherein the funnel-shaped forming surface (11) is arched in the direction of a centre axis of the second through-opening (9).

3. The crimping tool (1) according to claim 2, wherein the second pressing jaw (7) is divisible along a separation plane (12) through the second through-opening (9) into a first jaw part (13) and a second jaw part (14).

4. The crimping tool (1) according to claim 3, wherein the second jaw part (14) can be brought from an open position into a closed position, so that in the open position a cable (2) can be inserted laterally into the second pressing jaw (7).

5. The crimping tool (1) according to claim 4, wherein the second jaw part (14) is fixable in at least one of the open position and the closed position to the first jaw part (13) with at least one magnet (16).

6. The crimping tool (1) according to claim 3, wherein the first jaw part (13) and the second jaw part (14) are operatively connected via a joint (15).

7. The crimping tool (1) according to claim 2, wherein the second pressing jaw (7) is displaceable relative to the first pressing jaw (6) from a start position to an end position.

8. The crimping tool (1) according to claim 7, wherein in the end position the second pressing jaw (7) is arranged at least partially in a radial direction in the first pressing jaw (6).

9. The crimping tool (1) according to claim 7, wherein in the end position a first pressing surface (17) of the first pressing jaw (6) rests against a second pressing surface (18) of the second pressing jaw (7).

10. The crimping tool (1) according to claim 9, wherein the first pressing surface (17) surrounds the first through-opening in a ringlike manner (8) and the second pressing surface (18) surrounds the second through-opening (9) in a ringlike manner.

11. The crimping tool (1) according to claim 2, wherein at least one of the first and the second pressing jaw (6, 7) includes an embossing stamp (27) for applying an embossing to the crimp sleeve (4).

12. The crimping tool (1) according to claim 11, wherein the embossing stamp (27) is arranged on the forming surface (11).

13. The crimping tool (1) according to claim 11, wherein the embossing stamp (27) is arranged on the second pressing jaw (7) opposite the support surface (10) of the first pressing jaw (6).

14. The crimping tool (1) according to claim 2, wherein at least one of the first pressing jaw (6) includes a first pressing insert (19) around the first through-opening (8) and the second pressing jaw (7) includes a second pressing insert (20) around the second through-opening (9).

15. The crimping tool (1) according to claim 14, wherein the first pressing insert (19) is held in a first retainer (21) of the first pressing jaw (6) and/or the second pressing insert (20) is held in a second retainer (22) of the second pressing jaw (7) with at least one magnet (16).

16. The crimping tool (1) according to claim 14, wherein the first pressing insert (19) is fixed in the first retainer (21) with at least one spring pressure element (23).

17. The crimping tool (1) according to claim 14, wherein the second pressing insert (20) is dividable into a first and a second half of the insert (24, 25).

18. The crimping tool (1) according to claim 1, wherein the second pressing jaw (7) is divisible along a separation plane (12) through the second through-opening (9) into a first jaw part (13) and a second jaw part (14).

19. The crimping tool (1) according to claim 1, wherein the second pressing jaw (7) is displaceable relative to the first pressing jaw (6) from a start position to an end position.

20. The crimping tool (1) according to claim 1, wherein the first pressing jaw (6) includes a first pressing insert (19) around at least one of the first through-opening (8) and the second pressing jaw (7) includes a second pressing insert (20) around the second through-opening (9).

* * * * *